Dec. 29, 1959     A. E. BROWN     2,918,827
LINEAR ACTUATOR
Filed March 1, 1957
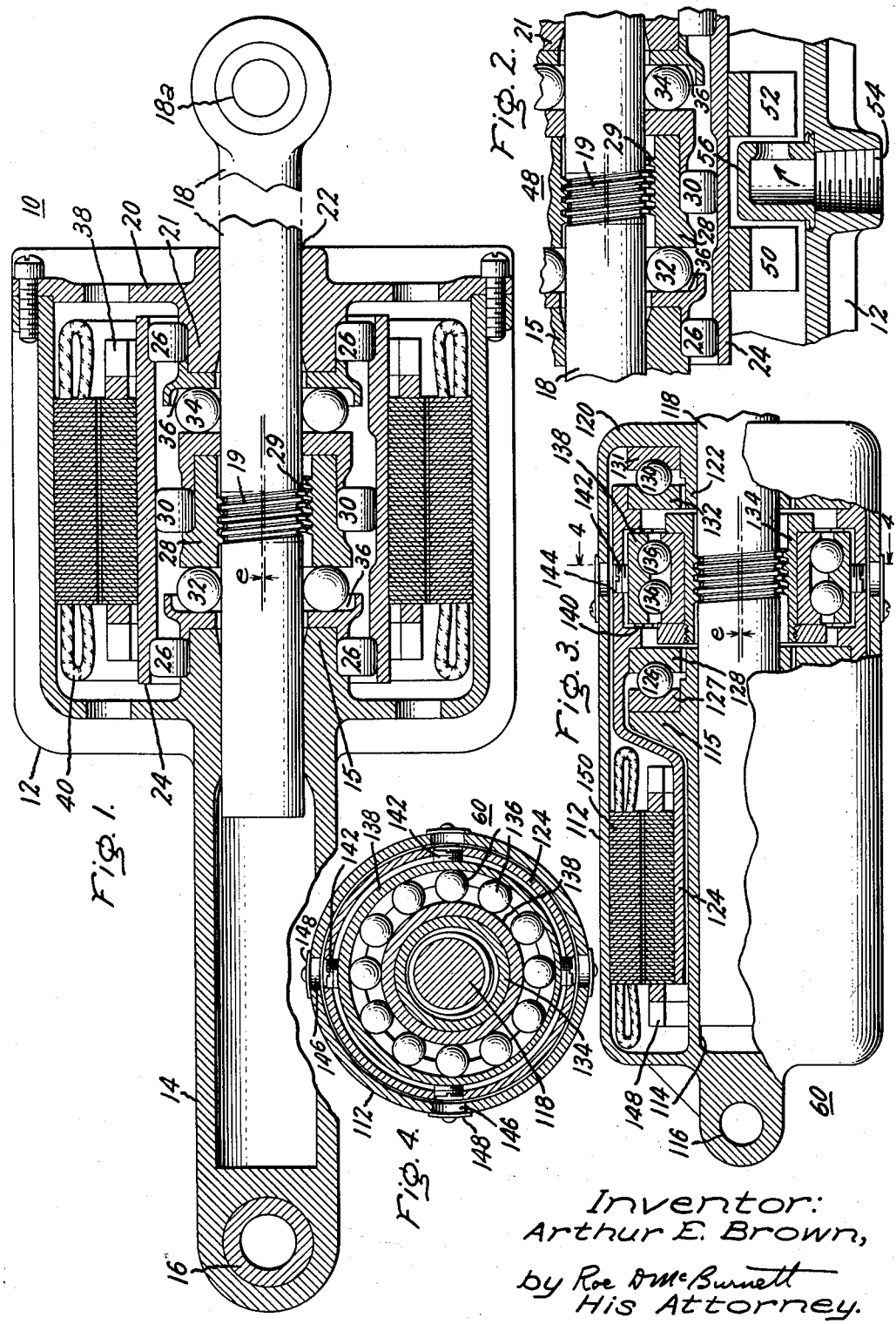
Inventor:
Arthur E. Brown,
by Roe D McBurnett
His Attorney.

United States Patent Office 2,918,827
Patented Dec. 29, 1959

2,918,827

LINEAR ACTUATOR

Arthur E. Brown, Scotia, N.Y., assignor to General Electric Company, a corporation of New York Application March 1, 1957, Serial No. 643,405

7 Claims. (Cl. 74—424.8)

The present invention relates to a linear actuator and more particularly to a linear actuator adapted to convert high speed rotary motion to low speed linear motion.

Generally, conventional linear actuators employ gear transmissions and associated shaft structures between a driving motor and a linearly actuated screw. For example, the gearing arragement will usually consist of a transmission having a number of coacting spur or bevel gears, or a combination thereof, and possibly a brake associated with the transmission to prevent movement of the screw after the motor has been turned off. The purpose of the gearing arrangement is to obtain a predetermined large speed reduction so that a usually small motor can rotate at high speed and yet advance the screw slowly.

Hence, it will be obvious that these presently utilized types of linear actuators incorporating speed reduction gearing in combination with a screw are characterized by large wear and friction between the relatively rotatable parts since, for example, the threads of the nut have sliding contact with the thread of the screw. The number of structural components associated with conventional actuators are great in number due to the necessity of having a large number of coacting structural members in a gear transmission to convert high speed rotary motion to low speed linear motion. Consequently, present actuators are distinguished by substantially high costs, a high degree of required maintenance, and by usually an average degree of reliability.

The present invention relates to a linear actuator powered either electrically, pneumatically, or by such similar motive means, and applicable for various aircraft and industrial uses. The actuator comprises a linearly displaceable screw which may or may not rotate and can be connected directly to an output member, such as an aircraft control rod, or the like, by means of a standard rod end. The screw is associated with a nut member having planetary motion with respect to the axis of the screw member so as to directly obtain a large speed reduction without the necessity of a gearing arrangement. The nut does not slide on the screw but merely allows the threads of the nut to roll against the threads of the screw to produce a rolling action instead of a sliding action typical in conventional gear reduction units.

Hence, less wear and friction between the nut and screw members is experienced and permits operation with a dry lubricant in high temperature aircraft applications. In brief, the present invention discloses a simple construction with very few coacting parts which allows a large speed reduction between the driving motor and the screw without the necessity of a gear speed reduction unit to thereby reduce the initial cost and maintenance costs, and further, to increase the reliability therein.

An object of the present invention is the provision of a linear actuator for converting high speed rotary motion to low speed linear motion.

Another object is to provide an actuator adapted to operate as a function of the rolling action between the driven rotary member and the linearly actuated output member instead of a function of a sliding action, to greatly reduce wear and friction between the relatively actuated members.

The further object of the invention is the provision of a linear actuator characterized by a fewer number of parts than conventional actuators so as to be lighter and more compact.

Other objects and many of the attendant advantages of this invention will be readily appreciated as the same becomes better understood by reference to the following detailed description when considered in connection with the accompanying drawings in which like reference numerals designate like parts throughout the figures thereof and wherein:

Figure 1 is a side view, partly in section, of a preferred embodiment of the invention illustrating the relatively few number of parts in the compact actuator;

Figure 2 is a sectional view of a modification of the device of Figure 1, illustrating the use of a turbine blade structure for supplying power to the actuator instead of the electric motor shown in Figure 1;

Figure 3 is a side view, partly in section, of a modification of the device of Figure 1, illustrating a compact motor and nut structure with adjustable means for varying the eccentricity of the nut relative to the screw member; and Figure 4 is a cross-sectional view of the device taken on the line 4—4 of Figure 3 looking in the direction of the arrows and illustrates an example of an eccentric adjusting means.

Referring now to the drawings, there is illustrated a preferred embodiment 10 comprising a cylindrical housing or casing 12 having at one end an integral end closure with a tube 14 axially protruding therefrom and provided with a pivotally mounting end 16 for direct coupling, for example, to a stationary structure. A screw 18 is slidably mounted in the casing 12 so as to be coaxially moveable relative to the tube 14, as hereinafter disclosed. The screw 18 is shown in Figure 1 as having standard acme threads 19, however other types of threads may be utilized in order to fit the particular installation.

An end cover 20 is provided to suitably close the other end of the casing 12 and is provided with an interior circular flange 21 substantially forming a bore 22 to permit the screw 18 to be axially slideable within the casing 12, as disclosed above. A carrier member 24 is rotatably mounted on an interior projecting flange 15 integral with the tube 14 and on the interior flange 21 through intermediate rows of bearings, such as roller bearings 26, or the like. Hence, the axis of rotation of the carrier 24 is coaxial with the axis of the screw 18 to prevent any relative radial movement therebetween.

A planetary nut 28 is rotatably mounted in the carrier 24 by means of a plurality of radially coplanar bearings, such as rollers 30, or the like. The nut 28 is provided with a thread pitch 29 which would be similar to the thread pitch 19 on the screw 18 but distinguished therefrom by having a slightly larger diameter, as indicated in the preferred embodiment of Figure 1. Further, the nut 28 is eccentrically mounted in the carrier 24 so that the axis of the nut is radially offset from the axis of the screw, as indicated in Figure 1 by the illustrative radial distance e.

The planetary nut is maintained axially stationary relative to the casing 12 by a number of bearings, such as ball bearings 32 and 34, which carry a high thrust loading which is not critical since they operate at low speed, as hereafter indicated. The bearings, 32 and 34 ride on structurally similar flat races 36, juxtaposed and fixed to each of the flanges 15 and 21 to accommodate both a rotational and a slight radial movement of the nut 28 relative to the casing 12 to allow the desired eccentricity in the preferred embodiment 10. The casing 12 is provided with an integral power unit, suitably controlled by conventional control means, not shown, which comprises a motor rotor 38 directly mounted on the carrier member 24 for mutual rotation therewith, while a motor stator 40 radially displaced therefrom is conventionally secured to the interior cylindrical surface of the casing 12.

In the operation of the preferred embodiment 10, the motor rotor 38 rotates the carrier member at high speed, in response to conventional motor controls, not shown. Next, the rotation of the carrier member 24 through frictional coaction with the bearings 30 cause the axis of the planetary nut 28, since the pitch diameter of the nut is greater than that of the screw, to travel in a very small orbit with a radius indicated by "e", about the axis of the screw 18, which in turn causes the threads of the nut to roll against the threads of the screw with a planetary motion. As indicated, the pitch diameter of the nut 28 is only slightly greater than the pitch diameter of the screw, so that the motor rotor 38 must take several hundred revolutions in order to advance the nut one thread on the screw 18. The order of speed reduction is determined by the eccentricity and diameters of the coacting nut and screw and the thread pitch thereof, so that the speed reduction can be predeterminedly set at substantially any desired ratio by selectively varying these structural relationships.

The axial thrust force of the nut is taken by bearings 32 and 34 located between the flange end 15 and the adjacent end of the planetary nut 28, and between the bearing 34 and the interior flange 21 of the end cover 20, respectively. In this manner, the bearings 32 and 34 accommodate both the rotational and the small radial movement of the nut, since the thrust bearings 32 and 34 have a gyratory motion on flat races. As disclosed in this particular embodiment, the screw member 18 moves axially within the casing 12 but does not rotate, and therefore can be connected directly to an output member through its rod end 18a.

In brief, the present invention discloses the combination of a power unit and a screw mechanism into a package actuator wherein the use of gear transmissions are eliminated, and friction and wear greatly reduced by the rolling action between the operating threads of the nut 28 and the screw 18. Although the thrust bearings 32 and 34 support high thrust loadings, bearing life and efficiency is greatly increased since they operate at slow speed due to the large speed reduction achieved between the carrier 24 and the nut 28. Thus, an actuator is provided which is lighter and more compact than conventional linear actuators and distinguished further by having fewer parts so that even with the high speed operative motor, a relatively low cost unit requiring less maintenance with increased reliability is achieved.

Figure 2 illustrates a modification 48 of the preferred embodiment 10 of Figure 1, wherein motor rotor 38 is replaced by a number of turbine wheels 50 and 52 integrally formed on the periphery of the carrier member 24 so as to extend radially therefrom a predetermined distance. The turbine wheels are formed so that the angle of attack of the wheel 50 will make it a clockwise wheel and rotate the carrier 24 accordingly, while the wheel 52 is so formed as to serve as a counter-clockwise turbine wheel and thusly rotate the carrier 24. The casing 12 is provided with an aperture 54 to provide an inlet for the high velocity fluid which selectively actuates the respective turbine wheel.

A rotatably adjustable nozzle box 56 is associated with the aperture 54 to selectively control the direction of flow through the aperture 54 to either the turbine wheel 50 or 52. The nozzle box is formed with a conventional nozzle of predetermined throat design to efficiently control the flow therethrough. In this modification 48, the fluid medium propelling the turbine wheel is allowed to leave the casing 12 through suitable apertures in the respective ends of the casing 12, clearly seen in Figure 1, which are normally present in such casings for cooling purposes, or the like.

The operation of the modification 48, is similar in all respects to that previously disclosed for the preferred embodiment 10, of course, differing only in the power means utilized for rotating the carrier member 24. In this particular modification, the fluid medium entering through the aperture 54 can be suitably controlled by conventional means, not illustrated, so that the fluid medium can be selectively directed toward either of the turbine wheels 50 or 52, depending on the desired direction of axial displacement of the screw 18.

Figure 3 discloses a further embodiment 60 of the present invention, wherein the power means are axially displaced from the planetary nut structure to obtain a more compact unit adaptable for operation in very small allowable accessory areas. The embodiment 60 is provided with a casing 112 formed with an internal axial tube 114 and with a pivotal end mounting 116 integral therewith. A screw 118 is slidably mounted within the casing 112 to be axially slideable within the tube 114 and within a circular flange 122 integrally formed on an end cover 120.

A carrier member 124 is provided within the casing 112 coaxial with the screw 118, and rotatably mounted on an end flange 115 of the tube 114 and on the flange 122. The carrier member is rotatably supported by a first row of bearings 126 operative between a suitable race 127 fixed to the end flange 115 of the tube 114 and a bearing race 128 fixedly secured to the carrier 124 and between a second row of bearings 130 operative between a race 131 fixed to the end cover 120 and a race 132 integral with the carrier 124. A planetary nut 134 is rotatably mounted in the carrier member by means of a plurality of bearings, such as ball bearings 136, or the like, operatively coacting with a radially adjustable bearing member 138 radially splined at 140 to the carrier 124 for rotation therewith.

The radial position of the bearing number 138, and consequently, of the operatively coacting nut 134 is controlled by a plurality of diametrically opposed screws 142 engaging suitable threaded bores 144 in the carrier member 124. Thus, radial displacement of the screws 142 within the carrier member 124 will displace the bearing member 138 to selectively control the eccentricity of the planetary nut 134 relative to the axis of the screw 118. This specific adjustable feature can be seen in Figure 4, wherein the casing 112 is provided with a number of diametrically opposed apertures 146 having suitable cover members 148 which can be pivoted to permit entrance to the screws 142 for adjustment of the eccentricity of the nut 134.

The planetary nut 134 is substantially similar in structure and function to the nut 28 of the preferred embodiment 10. In like manner, the nut 134 will have substantially the same thread pitch as the screw 118 only slightly larger in diameter. The nut is mounted eccentrically in the carrier 124 so that the axis of the nut is slightly offset from the axis of the screw as shown by the radial distance "e" in Figure 3. A motor rotor 148 is mounted on an axial extension of the carrier 124, and a motor stator 150 is secured to the inner circumferential surface of the casing 112. In this manner, a linear actuator with a reduced cross-sectional area is obtained to facilitate scope and adaptability of use.

The operation of the embodiment 60 of Figures 3 and 4, is substantially similar to that of the preferred embodiment 10. However, this particular embodiment is provided with means for varying the eccentricity of the planetary nut 134 relative to the screw 118 to obtain a variable ratio of speed reduction. In brief, it is within the scope of the present invention that the embodiment 60 may be used as a starting clutch wherein the nut 134 may be shifted from no eccentricity, amounting to no output, to full eccentricity which allows full output speed. Also, the present embodiment could be modified so that the screw could be rotated and the nut rotated about a fixed axis. Another variation within the scope of the present invention is to use two nuts with their axes oppositely located about the axis of the screw, if such is deemed desirable for a particular installation.

It should be understood, of course, that the foregoing disclosure relates to only preferred embodiments of the invention and that it is intended to cover all changes and modifications of the examples of the invention herein chosen for the purposes of the disclosure, which do not constitute departures from the spirit and scope of the invention as set forth in the appended claims.

What is claimed is:

1. A linear actuator adapted to convert high speed rotary motion to low speed linear motion in an output member comprising a linearly displaceable threaded screw connected to the output member, a nut member having a pitch diameter greater than the pitch diameter of said screw and the axis of said nut being offset from the axis of said screw, rotatable means coaxial with said screw and radially displaced from said nut, bearing means operatively coupling said rotatable means and said nut, said nut having substantially a planetary motion with respect to the threaded screw and the threads of said nut rolling against the threads of said screw to axially actuate said screw.

2. A linear actuator having a casing and a screw coaxially slideable therein, a threaded nut journaled within said casing and eccentrically mounted about said screw so that the respective threads are in rolling contact with each other, carrier means coaxial with said screw and radially spaced from said nut, bearing means operatively coupling said carrier means and said nut so that rotation of said carrier actuates said nut such that its axis moves in an orbit about the axis of said screw, driving means within said casing coaxially mounted with respect to said screw and fixed to said carrier means for mutual rotation.

3. A linear actuator comprising a cylindrical casing, a screw slideably mounted within said casing and coaxial therewith, a carrier member rotatably mounted within said casing coaxial to said screw, a nut rotatably mounted in said carrier and having a pitch diameter greater than the pitch diameter of said screw, said nut eccentrically mounted in said carrier so that the axis of said nut is radially offset from the axis of said screw, a number of radially projecting flat races associated with said casing and axially spaced from the ends of said nut, bearing means operatively coupling said nut with said races which are subjected to a high thrust loading at low speeds, said flat races operatively associated with said bearing means to accommodate rotational movement and radial movement of said nut to provide the desired eccentricity between said nut and said screw, motor means supported within said casing and having a motor rotor mounted on said carrier member for mutual rotation.

4. An actuator operating as a function of the rolling motion between a driven rotary member and a linearly actuated output member, said driven rotary member having a pitch diameter greater than the pitch diameter of the output member so that the axis of said rotary member has a planetary motion about the axis of said output member, driving means actuating said rotary member so that said output member will be linearly actuated at a substantial speed reduction with respect to said driving member, said driving means being concentric with said output member, and bearing means connecting said driving means and said rotary member for providing said planetary motion.

5. Actuator means having threaded nut means and similarly threaded screw means eccentrically mounted with respect to each other, said nut having a larger pitch diameter than said screw, rotatable means actuating said nut in an orbit about the axis of said screw, the respective threads of said nut and of said screw being in rolling contact with each other so as to axially move said screw relative to said nut, said rotatable means being concentric with said screw member.

6. A speed reduction unit comprising a non-rotatable threaded screw, a nut eccentrically mounted with respect to said screw, said nut having threads with a pitch diameter greater than the pitch diameter of said screw, and means for actuating said nut so that the axis of said nut planetates about the axis of said screw, said actuating means being concentric with said threaded screw whereby the threads of said nut are in rolling contact with the threads of said screw for its linear actuation.

7. Actuator means having axially slideable screw means, a threaded nut having a pitch diameter greater than that of said screw and an axis offset from the axis of said screw, said nut being axially fixed with respect to said screw, means for actuating said nut so that the axis of said nut has a planetary motion about the axis of said screw so that the respective coacting threads are in rolling contact for axially actuating said screw, said actuating means being concentric with said screw means.

References Cited in the file of this patent

UNITED STATES PATENTS

| | | |
|---|---|---|
| 2,446,393 | Russell | Aug. 3, 1948 |
| 2,477,701 | McCallum | Aug. 2, 1949 |
| 2,482,082 | Wahlberg | Sept. 13, 1949 |
| 2,556,572 | Brinkhurst | June 12, 1951 |
| 2,611,280 | Brinkhurst | Sept. 23, 1952 |
| 2,616,302 | Wahlmark | Nov. 4, 1952 |